L. G. KNIFFEN.
Harvester Cutter.
No. 42,331.
Patented April 12, 1864.
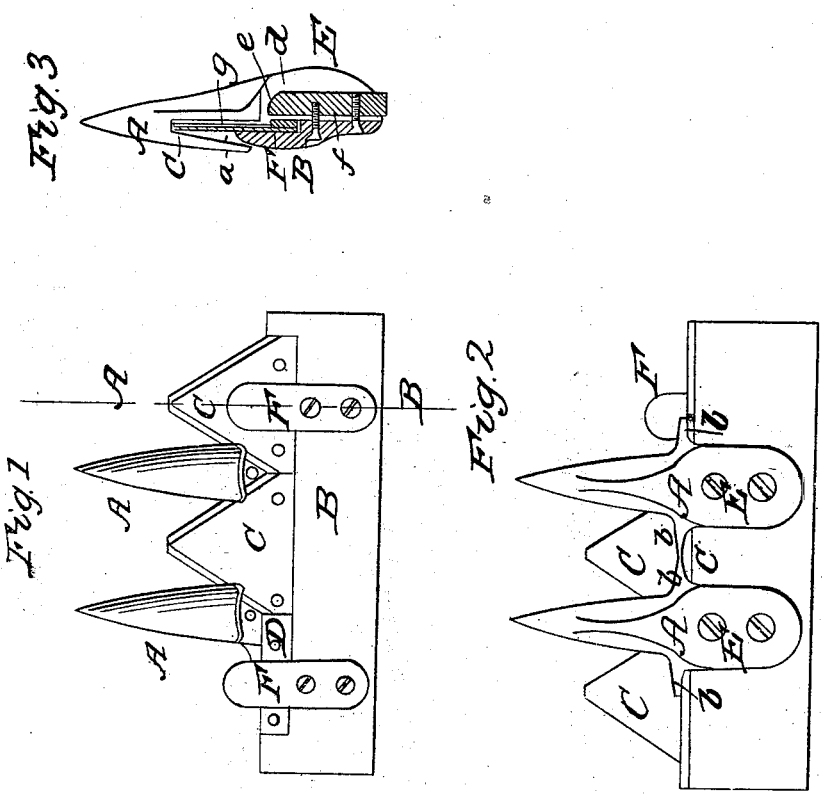
Inventor
L. G. Kniffen
by his Attorney
Hny H. Dodge
Witnesses
Geo H. Miller
Alpins Brown

UNITED STATES PATENT OFFICE.

L. G. KNIFFEN, OF WORCESTER, MASSACHUSETTS, ASSIGNOR TO HIMSELF, ALZIRUS BROWN, AND THOMAS H. DODGE.

IMPROVEMENT IN HARVESTERS.

Specification forming part of Letters Patent No. 42,331, dated April 12, 1864.

*To all whom it may concern:*

Be it known that I, L. G. KNIFFEN, of the city and county of Worcester, and State of Massachusetts, have invented certain new and useful Improvements in the Cutting Apparatus of Harvesters; and I do hereby declare that the following is a full, clear, and exact description of the same, reference being had to the accompanying drawings, forming a part of this specification, and in which—

Figure 1 represents a top view. Fig. 2 represents a bottom view; and Fig. 3 represents a section on line A B, Fig. 1.

By reference to the drawings it will be seen that the guard or finger A has the rear portion of the slot $a$ left open, while the wings or flanges $b\ b$ are extended on each side of the guard A, so that the wings or flanges of one guard or finger will meet those of the other guard, as clearly indicated in the drawings, and thus form a continuous bearing for the sickle C and a front bearing for the sickle-bar D. The rear portion of the guard is depressed to receive the bottom of the finger-beam B, as shown at E, Fig. 3, while the front of the finger-beam is fitted to bear against the angles $d$ $e$ of the guard. The cutter-bar D does not run directly in contact with the top of the finger-beam B, but upon plates $f$, placed at proper distances apart and under the separate back guides, F, fastened to the finger-beam. By this arrangement a free discharge of all clogging matter, both below and in rear of the sickle and its bar, is obtained, while the friction of the bar is much less than it would be if the lower surface thereof rested and reciprocated upon a bearing extending its entire length. The lower part of each wing or flange $b$ is contracted or beveled off toward its end, so as to expose the front edge of the finger-beam B, as seen at $c$, and consequently the apparatus glides over the ground with greater ease and with less danger of clogging than it would if the wings or flanges $b$ extended down in front of the finger-beam their whole length and formed abrupt shoulders to strike against the turf, dirt, and other obstructions.

A steel plate, $g$, is used in connection with the guard, as set forth in Salem Copeland's patent of 1861.

Having described my improved cutting apparatus for harvesters, what I claim therein as of my invention, and desire to secure by Letters Patent, is—

A scalloped reciprocating sickle or cutter with its bar supported and working upon friction-plates $f$, and separate back guides to retain the former in place, in combination with open cap-slotted guard-fingers, having contracted or beveled wings or flanges $b\ b$ to support the cutters above and permit of the free passage of dirt below, and with the angles $d$ $e$ to fit the finger-bar, all as shown and described.

L. G. KNIFFEN.

Witnesses:
JOHN D. CANDEE,
P. S. MUNSON.